United States Patent [19]
Kishimoto

[11] Patent Number: 5,687,073
[45] Date of Patent: Nov. 11, 1997

[54] INITIAL PROGRAM LOADING SYSTEM FOR MULTIPROCESSOR SYSTEM

[75] Inventor: Kuniyuki Kishimoto, Kawasaki, Japan

[73] Assignee: Fujitsu Limited, Kanagawa, Japan

[21] Appl. No.: 390,758

[22] Filed: Feb. 17, 1995

[30] Foreign Application Priority Data

Mar. 16, 1994 [JP] Japan ................................. 6-045424

[51] Int. Cl.⁶ ..................... G05B 14/18; G06F 3/00
[52] U.S. Cl. .................. 364/131; 395/200.01; 395/652
[58] Field of Search ..................... 364/131–134, 364/DIG. 1, DIG. 2, 280.2, 280.3, 280.9, 230, 230.1, 230.3, 230.6, 228.1, 229, 229.3, 229.4; 395/200, 375, 700, 800, 652, 653, 821–825, 829, 200.1, 200.8

[56] References Cited

U.S. PATENT DOCUMENTS

| | | |
|---|---|---|
| 4,752,870 | 6/1988 | Matsumura ..................... 395/700 |
| 4,943,911 | 7/1990 | Kopp et al. ..................... 364/200 |
| 5,305,457 | 4/1994 | Takida et al. ..................... 395/700 |
| 5,349,664 | 9/1994 | Ikeda et al. ..................... 395/700 |

*Primary Examiner*—Reba I. Elmore
*Assistant Examiner*—Thomas E. Brown
*Attorney, Agent, or Firm*—Helfgott & Karas, PC.

[57] ABSTRACT

An IPL requesting processor sends an IPL request to a communication path. The other processors detect the IPL request. When a communication channel is secured between the IPL requesting processor and a management processor that holds IPL management data, the management processor transfers the IPL management data to the IPL requesting processor. The IPL management data include data related to load assignable processors and IPL data. The IPL requesting processor receives statuses from load assignable processors. According to the statuses and the IPL management data, the IPL requesting processor allocates IPL data segments to the load assignable processors and instructs them to provide the allocated IPL data segments. The IPL requesting processor receives the IPL data segments from these processors and stores them, thereby obtaining necessary IPL data.

3 Claims, 20 Drawing Sheets

←----→ COMMUNICATION FOR EXECUTING IPL

←——→ MANIPULATION FOR SYSTEM NORMAL OPERATION

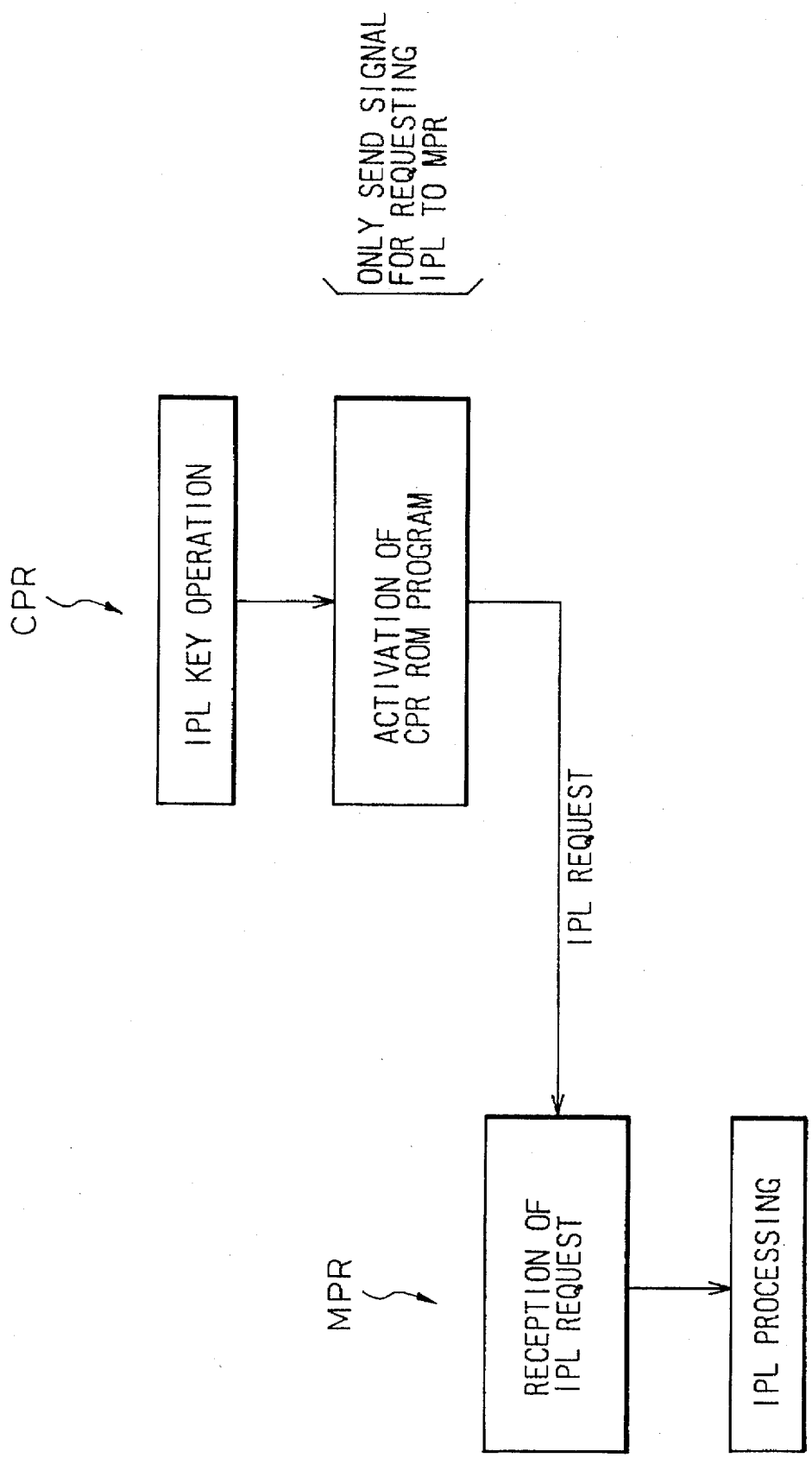

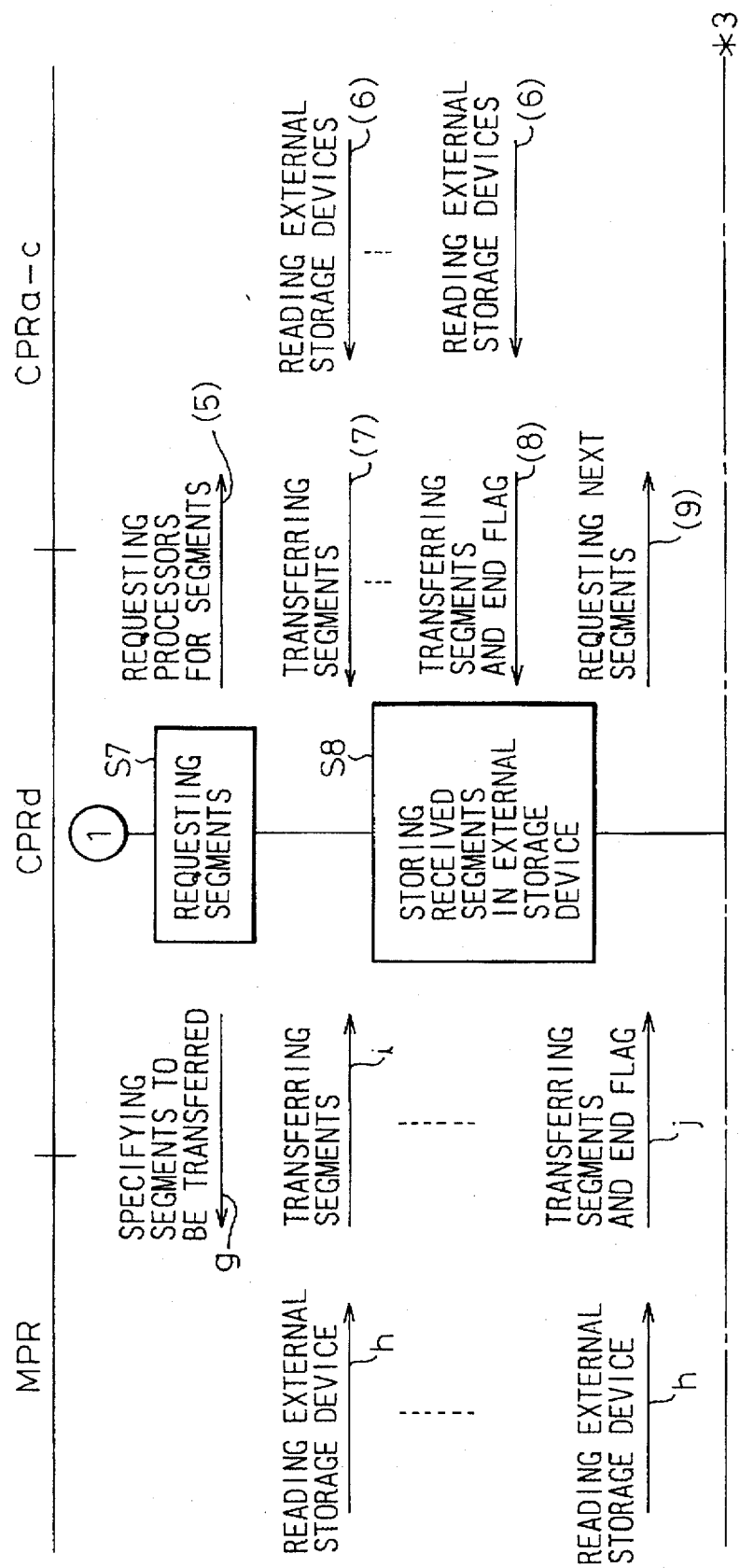

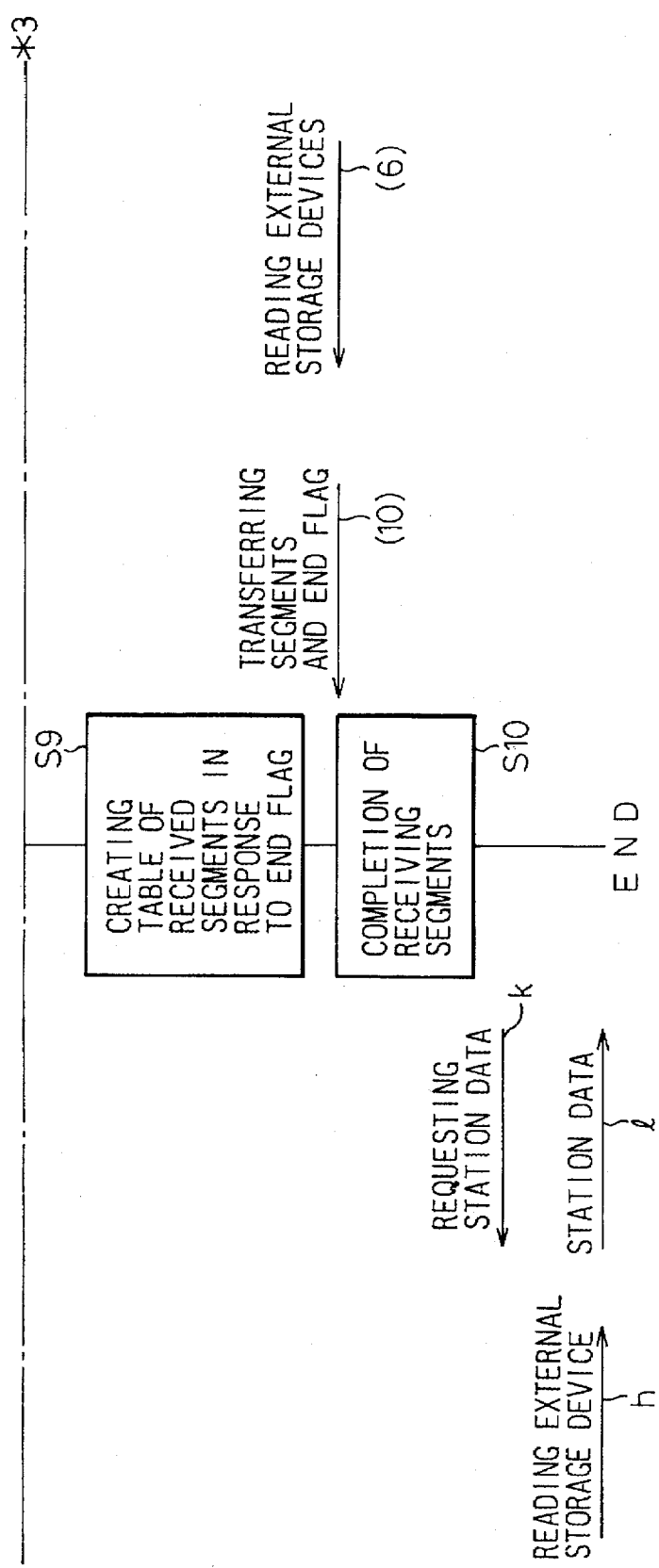

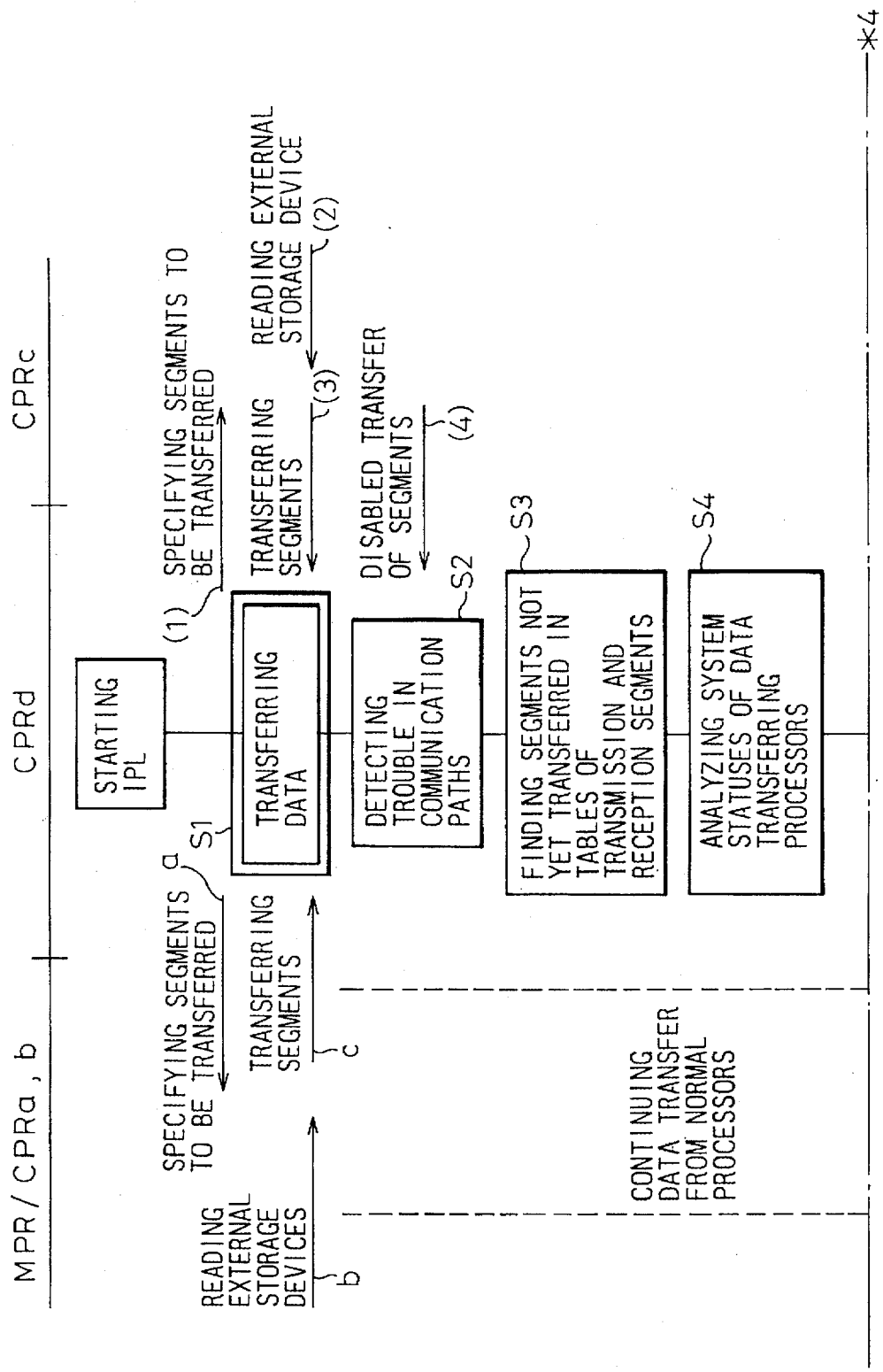

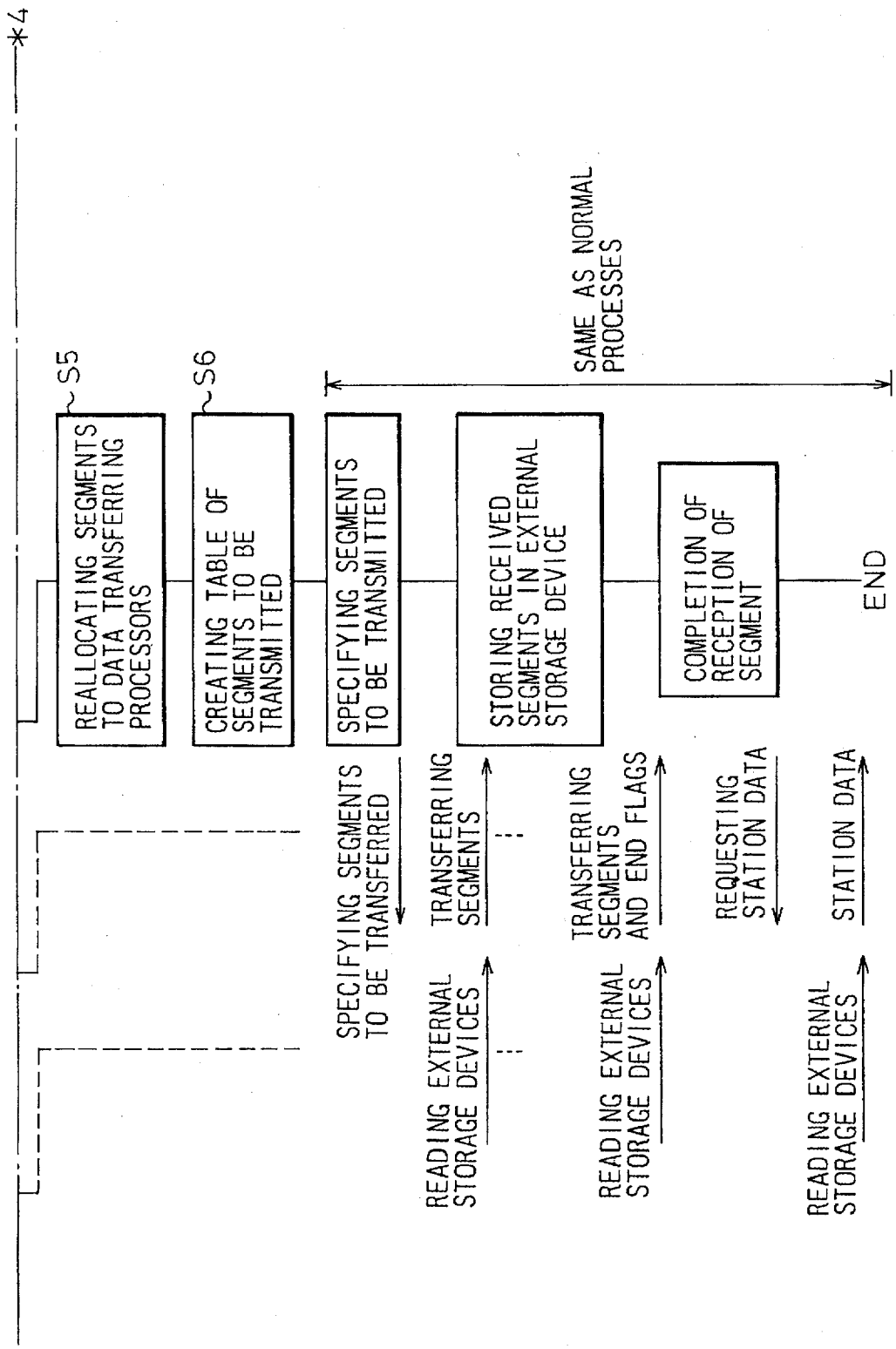

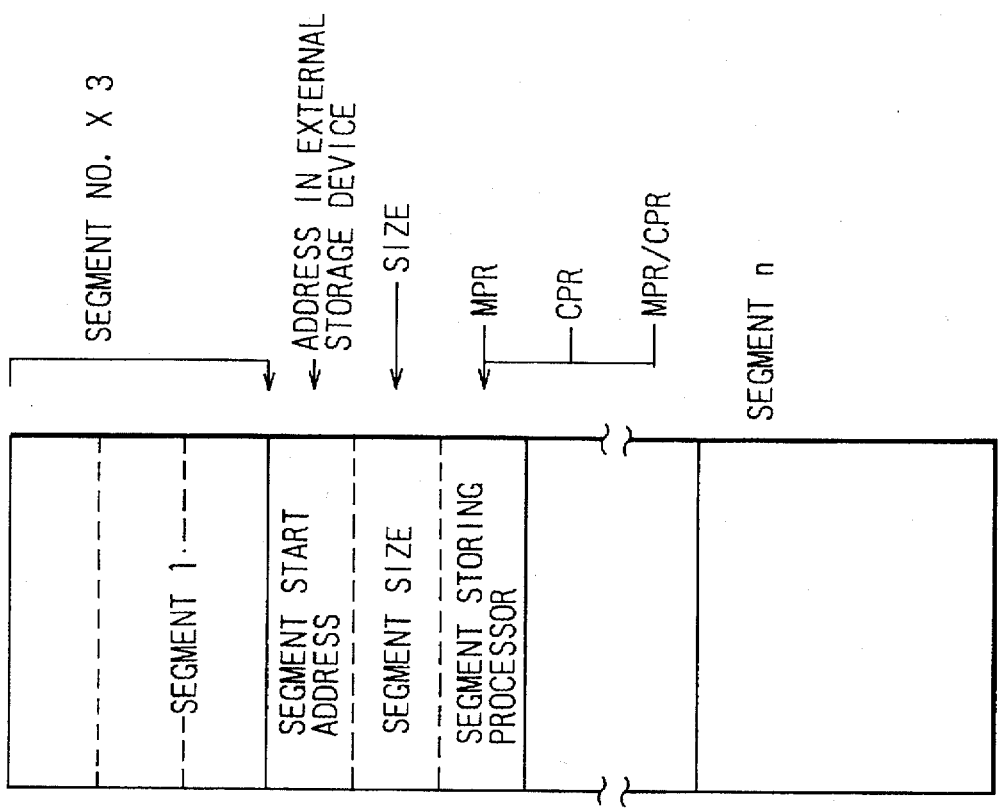
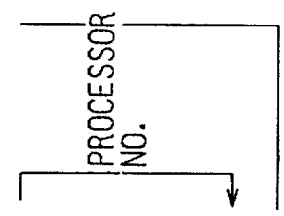
Fig.11

Fig.15
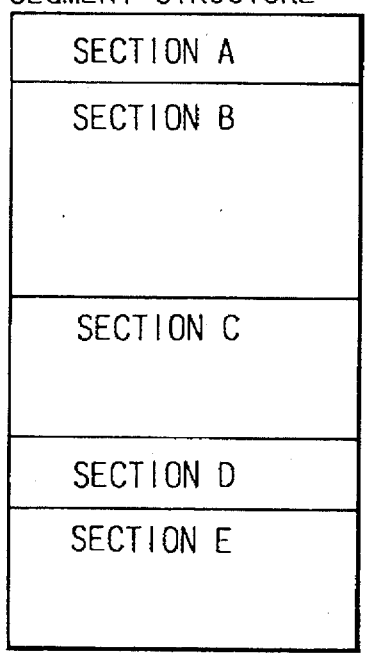
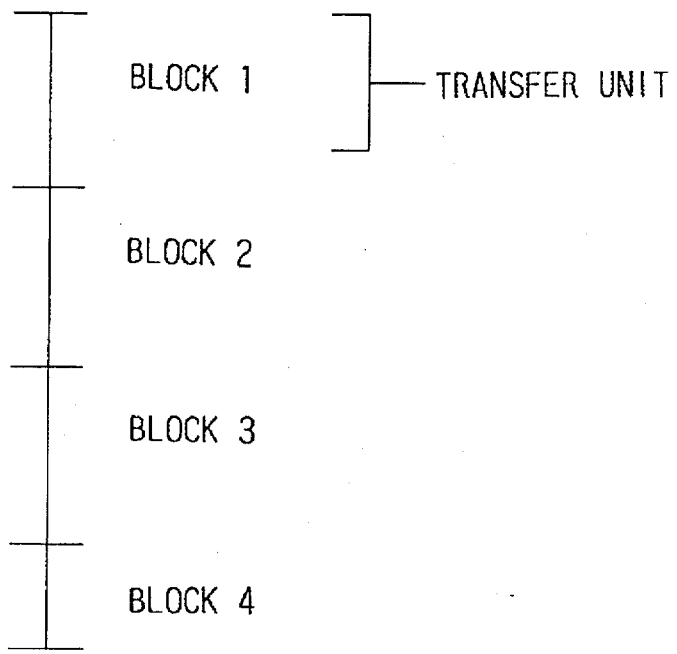

1

INITIAL PROGRAM LOADING SYSTEM FOR MULTIPROCESSOR SYSTEM

BACKGROUND OF THE INVENTION

1. Field of the Invention

The present invention relates to an IPL (initial program loading) system for a multiprocessor system, and more particularly to an IPL system for a distributed-processing system with which is directly connected between a plurality of processors, except for a connection bus with which is connected via a certain processor such as the STAR computer.

2. Description of the Related Art

Information processing systems such as electronic exchange systems employ a multiprocessor system that connects a plurality of processors to one another through a ring bus. Each of the processors in the multiprocessor system must carry out an IPL process. Usually, one of the processors serves as a management processor to control the IPL process. The IPL process puts heavy load on the management processor, to hinder the original management function of the processor. It is necessary to solve this problem.

The sizes of information processing systems and electronic exchange systems are increasing according to improvements in functions and an increase in users. The sizes of the programs and the volumes of data stored in the systems are increasing accordingly. It is necessary to transfer many programs and a large volume of data to carry out an IPL process and this temporarily increases the load on a management processor. If this state continues, it may adversely affect other, normally operating processors.

SUMMARY OF THE INVENTION

The present invention aims to solve the above-mentioned drawbacks in the prior art.

An object of the present invention is to provide an IPL system for a multiprocessor system having a plurality of processors that are connected to one another through a communication path. This IPL system prevents any one of the processors from suffering an excessive load due to an IPL process and shortens the time needed for the IPL process.

In accordance with an aspect of the present invention, there is provided an initial program loading system, for a multiprocessor system having a plurality of processors that communicate data with one another through communication paths and share programs and data with one another, including:

one processor serving as an IPL requesting processor that issues an IPL request to be received by the other processors, another processor serving as a management processor that holds IPL management data including data of load assignable processors that may provide the IPL requesting processor with IPL data, the IPL management processor transferring the IPL management data to the IPL requesting processor when a communication path is secured between them, the IPL requesting processor assigning, according to the data of load assignable processors and the statuses of these processors, processors that must provide segments of IPL data and issuing instructions to the assigned processors, to transfer the IPL data, the assigned processors transferring the specified segments of IPL data to the IPL requesting processor, which receives the IPL data and stores the data in a storage device.

BRIEF DESCRIPTION OF THE DRAWINGS

FIG. 4 is a view showing the generation of an IPL requesting call.

FIGS. 9A and 9B form a view showing an IPL sequence (2) in the normal state;

FIGS. 10A and 10B form a view showing an IPL sequence when a fault occurs;

FIG. 11 is a view showing an example of a table of segments;

FIG. 15 is a view showing the segment structure;

PREFERRED EMBODIMENTS OF THE INVENTION

An embodiment of the present invention will be described hereinafter with reference to a prior art drawing.

Figure 1:
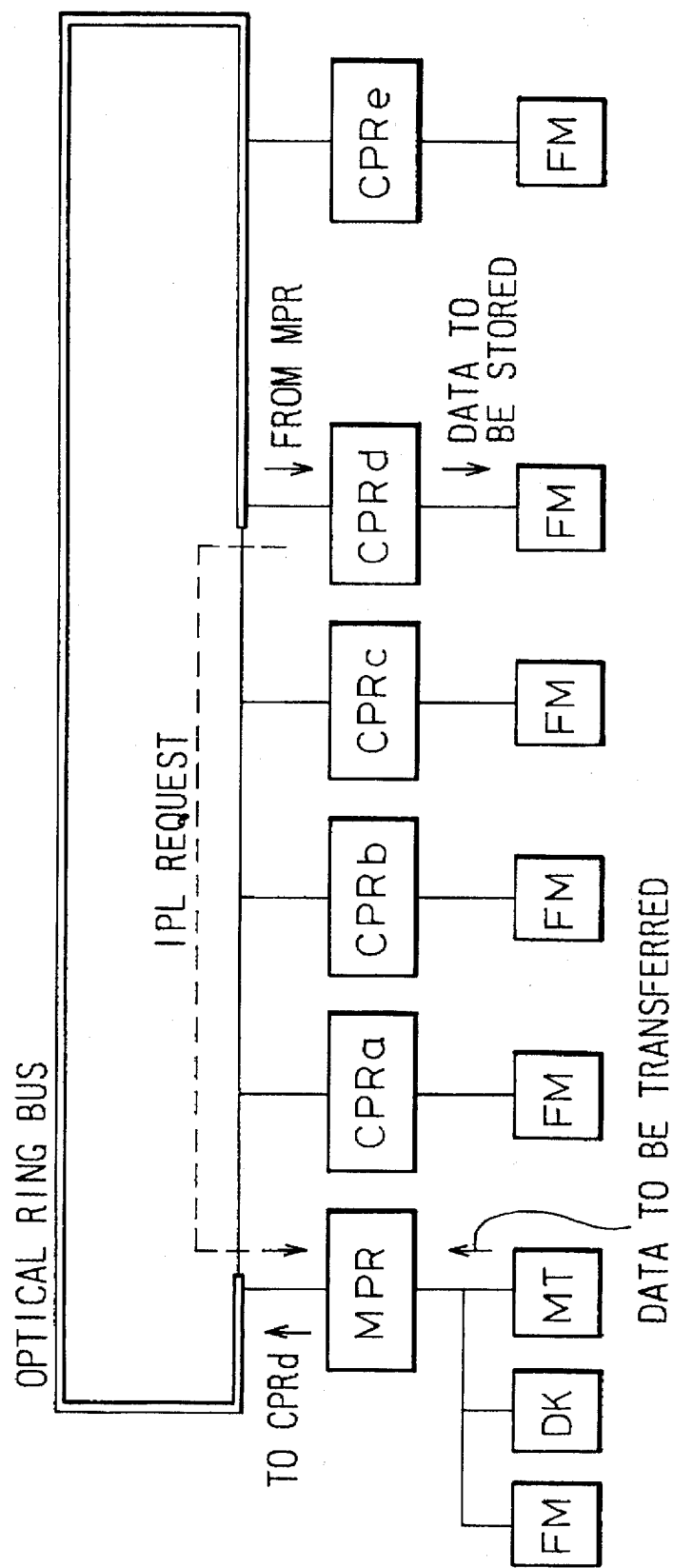
FIG. 1 is a schematic block diagram showing a conventional multiprocessor system applied to an electronic exchange system.

FIG. 1 shows a conventional multiprocessor system adopted for an electronic exchange system.

The multiprocessor system includes an optical ring bus RB, a management processor MPR for managing the electronic exchange system, call processors CPRa to CPRe to process distributed calls, and external storage devices FM, DK, and MT. Here, FM is a file memory, DK is a magnetic disk, and MT is a magnetic tape.

An IPL process to be carried out in the call processor CPRd will be sequentially explained.

(1) The call processor CPRd issues an IPL request to the management processor MPR.

(2) Upon receiving the IPL request, the management processor MPR transfers an IPL data reception program (a boot program) to the call processor CPRd and, thereafter, sends IPL programs and data from the external devices FM, DK, and MT to the call processor CPRd.

(3) The call processor CPRd runs the boot program to receive the IPL data from the management processor MPR and stores the received data in the external device FM.

(4) During the IPL process, the management processor MPR must continue to communicate with the call processors CPRa to CPRc.

Figure 2:
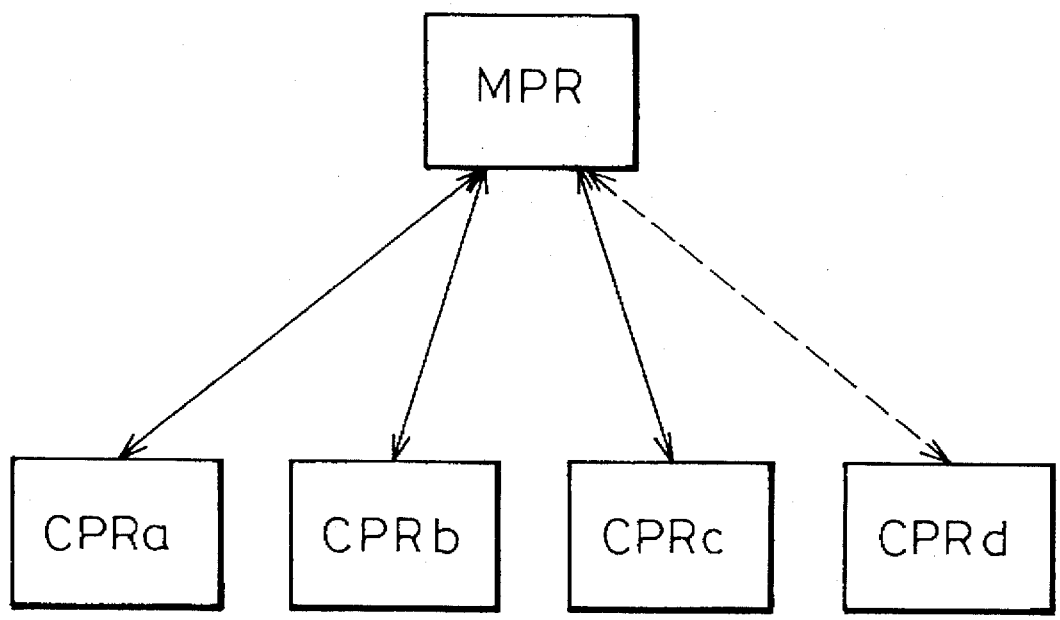
FIG. 2 is a view showing an uninterruptible communication between MPR and CPRa–CPRc, when an IPL requesting call generates in a call processor CPRd.

FIG. 2 shows a communication in a normal state of operation in a conventional system, in which if an IPL requesting call generates in a call processor CPRd, a communication between a management processor MPR vs. each of call processors CPRa, CPRb, and CPRc does not suspend.

Information processing systems and electronic exchange systems are expanding due to improvements in their functions and to an increase in the number of users. The number of programs and the volume of data stored in the systems are increasing accordingly. It is necessary to transfer many programs and data to carry out an IPL process and this temporarily increases the load on a management processor. If this state continues, it will adversely affect other, normally operating processors.

Figure 3A:
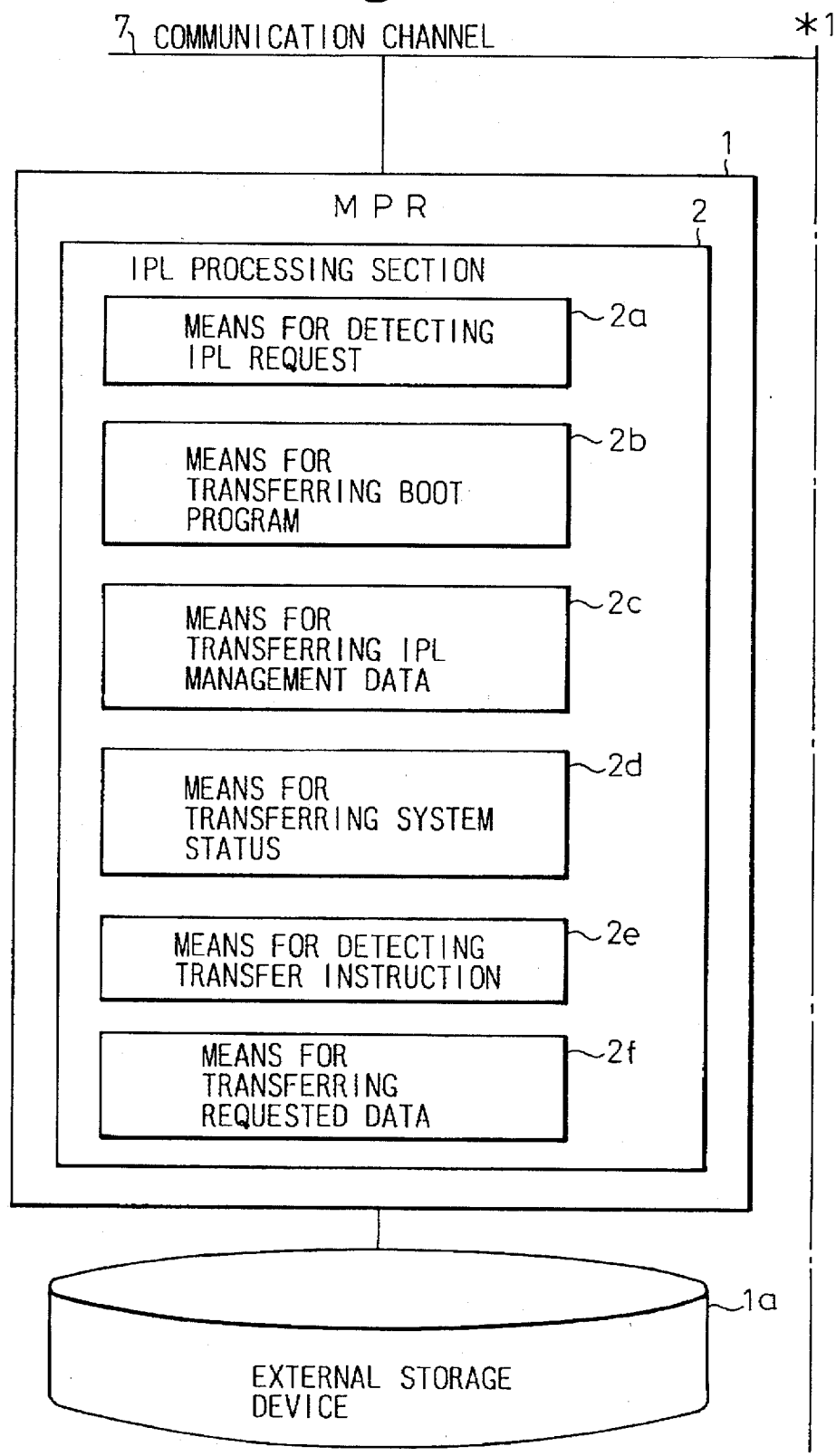
FIGS. 3A–3C form a view showing the basic principle of the present invention.
Figure 3B:
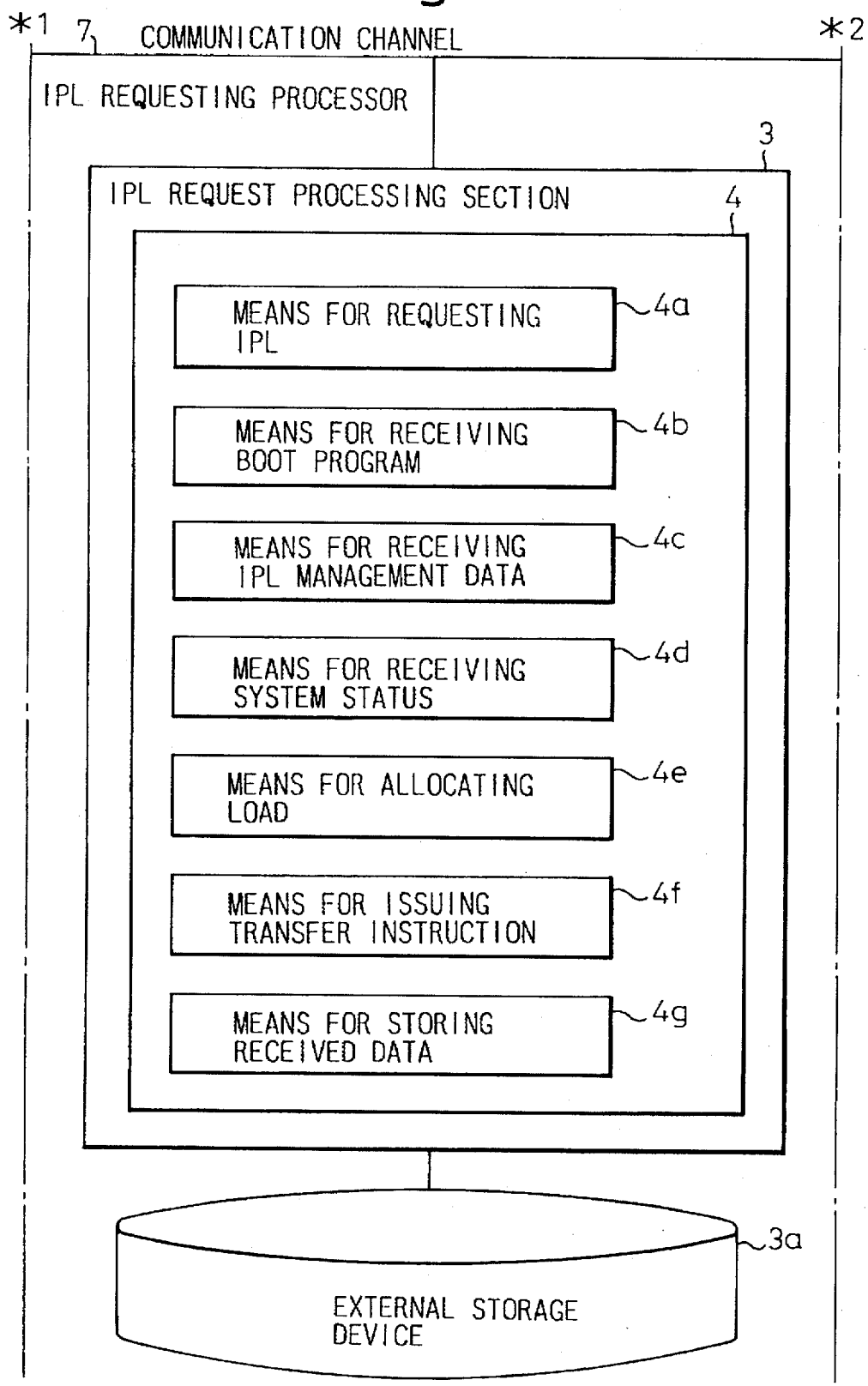
Figure 3C:
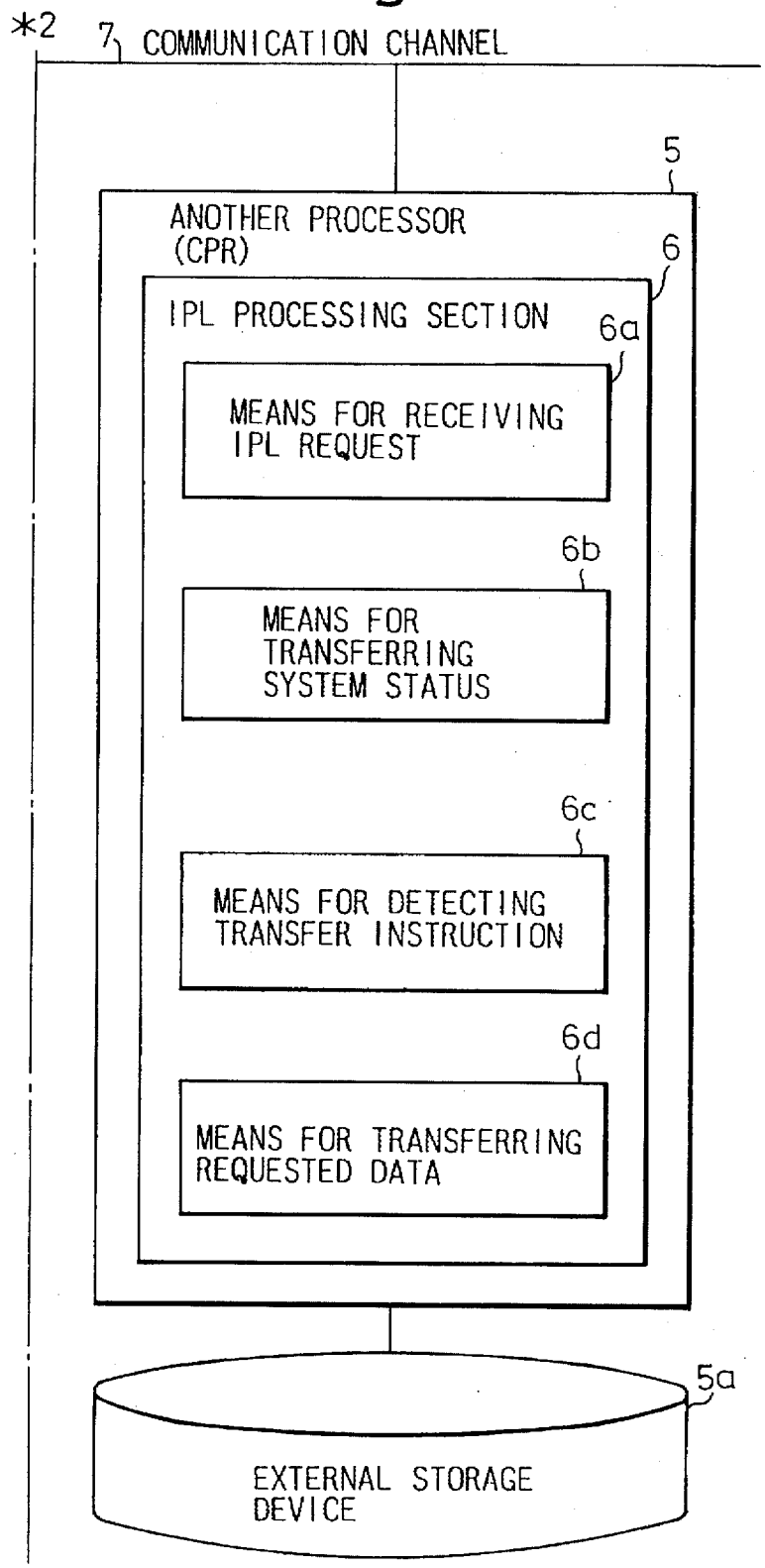

FIGS. 3A, 3B and 3C explain the principle of the present invention.

In FIGS. 3A, 3B and 3C, reference numeral 1 denotes a management processor (MPR) for keeping IPL management data such as data related to the amount of IPL data and processor data related to an object of load distribution, 1a an external storage device, 2 an IPL processing section which is incorporated in the management processor 1 and which is activated in response to a notification of an IPL request to be processed, 3 an IPL requesting processor that issues an IPL request and 3a is also an external storage device. Reference numeral 4 denotes an IPL request processing section which is incorporated in the IPL requesting processor 3 and handles an IPL request when an IPL request occurs, 5 another processor (CPR) that receives a notification of the IPL request from the IPL requesting processor 3 and keeps IPL data, 5a is also an external storage device, 6 an IPL (acceptance) processing section incorporated in another processor 5, to receive and process the IPL request, and 7 a communication channel to connect many processors to one another and communicate data among them.

Regarding the generation of IPL request, FIG. 4 shows a functional response between CPR (5) and MPR (1) in FIGS. 3A–3C. The IPL request is generated by an operator who depresses an IPL key for executing an IPL process at the another processor (CPR) side.

Although FIGS. 3–3C show only one management processor 1 that keeps the IPL management data, it is possible to employ a plurality of management processors. Similarly, there may be an optional number of processors 5.

In response to an IPL request from the IPL requesting processor in the multiprocessor system, the management processor transfers the IPL management data to the IPL requesting processor. According to the IPL management data, the IPL requesting processor identifies processors that are keeping data necessary for carrying out an IPL process. The IPL requesting processor receives system statuses of the identified processors, selects those having a margin in load among the identified processors, allocates IPL data to be sent to the selected processors, and receives the IPL data from the processors.

When the IPL requesting processor 3 needs to carry out an IPL process, it activates the IPL request processing section 4. An IPL request unit 4a sends an IPL request to the communication path 7. The IPL processing section 2 of the management processor 1 and the IPL processing section 6 of the processor 5 detect the IPL request. In the IPL processing section 2 of the management processor 1, an IPL request detection unit 2a detects the IPL request and activates a boot program transfer unit 2b, which reads a boot program, i.e., an IPL data reception program out of the external storage device 1a and transfers it to the IPL requesting processor 3 through the communication path 7. A boot program reception unit 4b of the IPL requesting processor 3 receives and keeps the boot program. An IPL management data transfer unit 2c of the management processor 1 reads IPL management data out of the external storage unit 1a and sends them to the communication path 7. The IPL management data include data necessary for the IPL process and data of load assignable processors that are holding IPL data.

An IPL management data reception unit 4c of the IPL requesting processor 3 receives the IPL management data. According to the data, the IPL requesting processor 3 identifies the load assignable processors and secures the communication path 7 with respect to the load assignable processors. System status transfer units 2d and 6b of the load assignable processors (the management processor 1 and the processor 5 in FIGS. 3A to 3C) notify the IPL requesting processor 3 of system statuses such as load conditions. A system status reception unit 4d of the IPL requesting processor 3 receives the system statuses.

According to the received IPL management data and system statuses, a load allocation unit 4e of the IPL requesting processor 3 identifies IPL data necessary for the IPL process and allocates the IPL data to those having a margin in load among the load assignable processors. According to the allocation, a transfer instruction unit 4f of the IPL requesting processor 3 sends instructions through the transmission path 7, to the selected processors, to send the allocated IPL data.

Transfer instruction detection units 2e and 6c of the assigned processors, i.e., the management processor 1 and the processor 5 detect the instructions, and the requested data transfer units 2f and 6d thereof read the specified IPL data out of the external storage devices 1a and 5a and transfer them to the IPL requesting processor 3 through the communication path 7. A storing unit 4g of the IPL requesting processor 3 stores the IPL data in the external storage unit 3a. In this way, the IPL requesting processor 3 receives all the necessary pieces of IPL data from the processors and stores them in the external storage device 3a.

As explained above, a processor that is going to carry out an IPL process separately receives IPL data from a plurality of processors that have a margin in load at the moment. As a result, a management processor never bears an excessive load, and the IPL requesting processor quickly carries out the IPL process.

Figure 5:
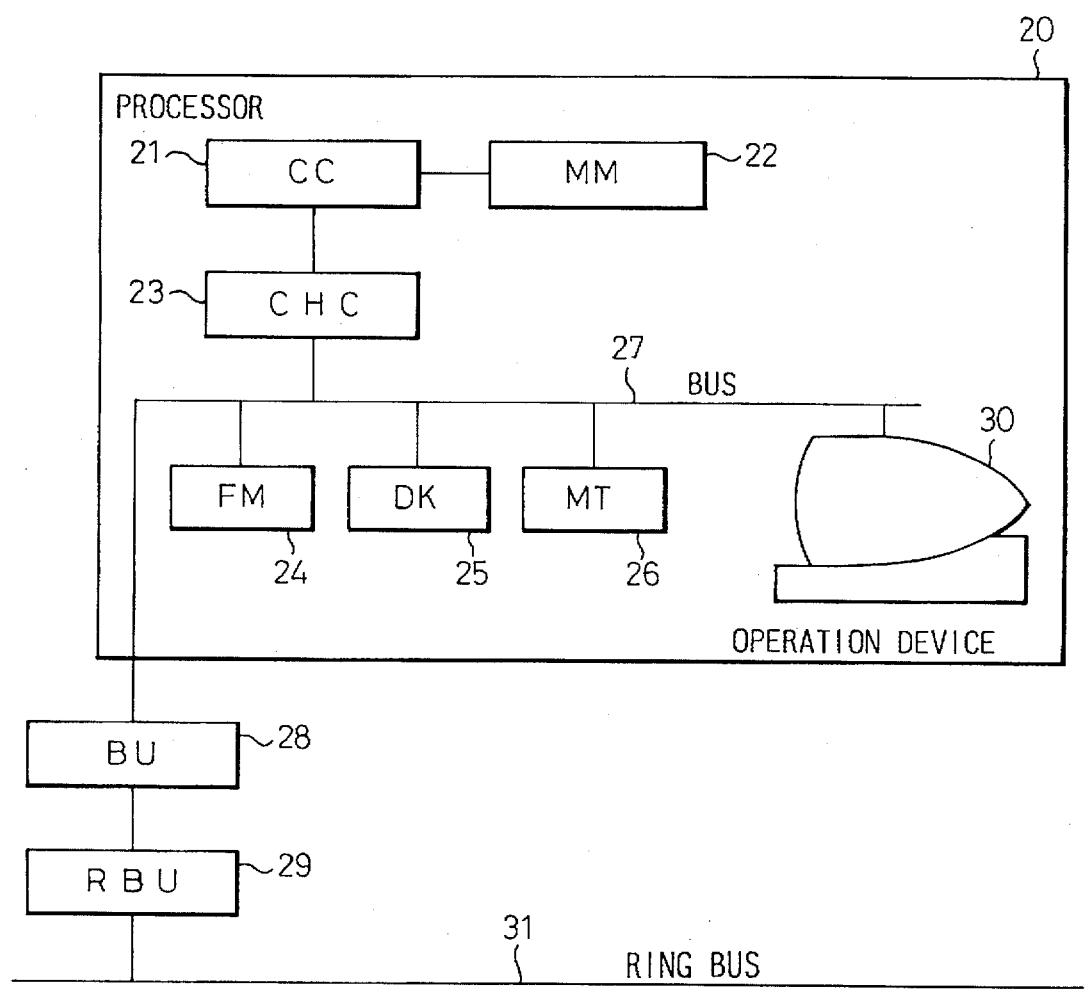
FIG. 5 is a schematic connection diagram showing a processor in a system to which the present invention is applied.

FIG. 5 shows a processor in a system that adopts the present invention. This processor may serve as a management processor (MPR) or a call processor (CPR).

FIG. 5 shows the processor (MPR or CPR) 20, a central controller (CC) 21, a main memory (MM) 22, a channel controller (CHC) 23, a file memory (FM) 24, a magnetic disk unit (DK) 25, a magnetic tape unit (MT) 26, a bus 27, a bus interface unit (BU) 28 serving as an interface between the bus 27 of the processor 20 and an external device, a ring bus unit (RBU) 29 serving as an interface between a ring bus and the processor, an operation unit 30 provided for the management processor and having a keyboard and a display to enter data, and the ring bus 31 corresponding to the communication path 7 of FIGS. 3A to 3C, to sequentially connect a plurality of processors to one another. The call processor may have only the file memory 24 as an external storage device.

In practice, the bus interface unit BU is to control a C-bus interface between a channel controller CHC and a ring bus unit RBU and the ring bus unit RBU is to control a ring-bus interface for connecting the RBU between each processors.

The processor 20 is connected to other processors in a ring through the bus interface unit BU 28, ring bus unit RBU 29, and ring bus 31, to transmit and receive data to and from other processors. The central controller CC 21 of the processor 20 carries out processings for executing the function of an exchange according to programs and data, stored in the main memory 22 and external storage devices such as the file memory 24, magnetic disk unit 25, and magnetic tape unit 26. The call processor carries out an IPL process according to programs and data transferred from the management processor or from other processors.

Figure 6:
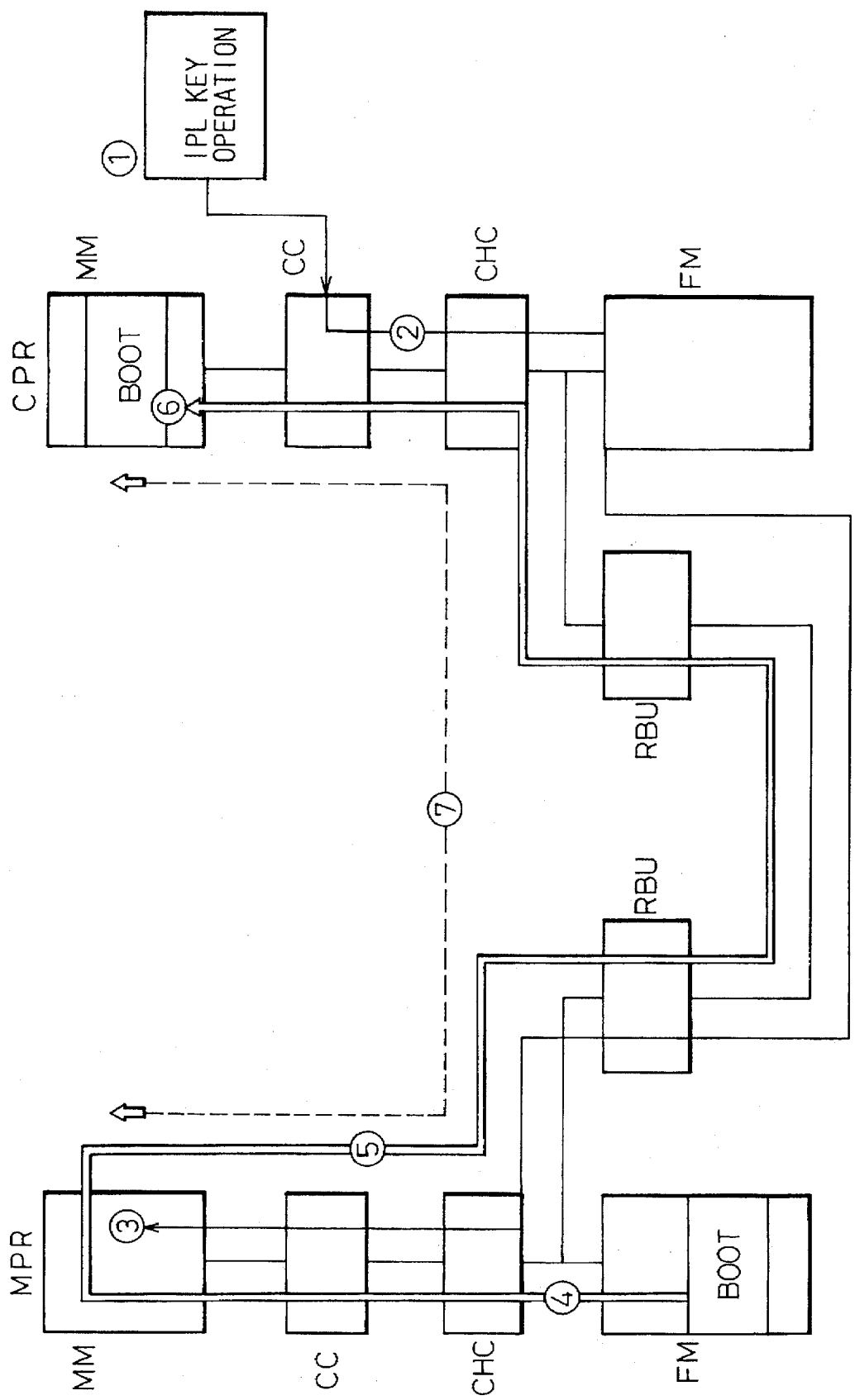
FIG. 6 is a view showing the activation process of a Boot program.

A location where the program that a processing of the present invention is implemented is accommodated and its transfer state are described in FIG. 6. In general, a boot program for processing the IPL process according to the present invention is incorporated in an external storage device FM of the management processor MPR.

The operation up to activation of the boot program will be explained.

Step ① An IPL request is issued by an operator from a call processor CPR or another processor.

Step ② An IPL request signal is sent to a management processor MPR from the program stored in a ROM of a central controller CC in the call processor CPR.

Step ③ The management processor MPR receives a signal sent in step ②.

Step ④ From a file memory FM of the management processor MPR, the boot program is read.

Step ⑤ The boot program is sent to the call processor CPR in which the IPL request was implemented.

Step ⑥ The boot program is transferred onto a main memory device MM on the CPR side.

Step ⑦ Then, the boot program is activated to implement a processing transferring data in an initial program loading (IPL).

Figure 7:
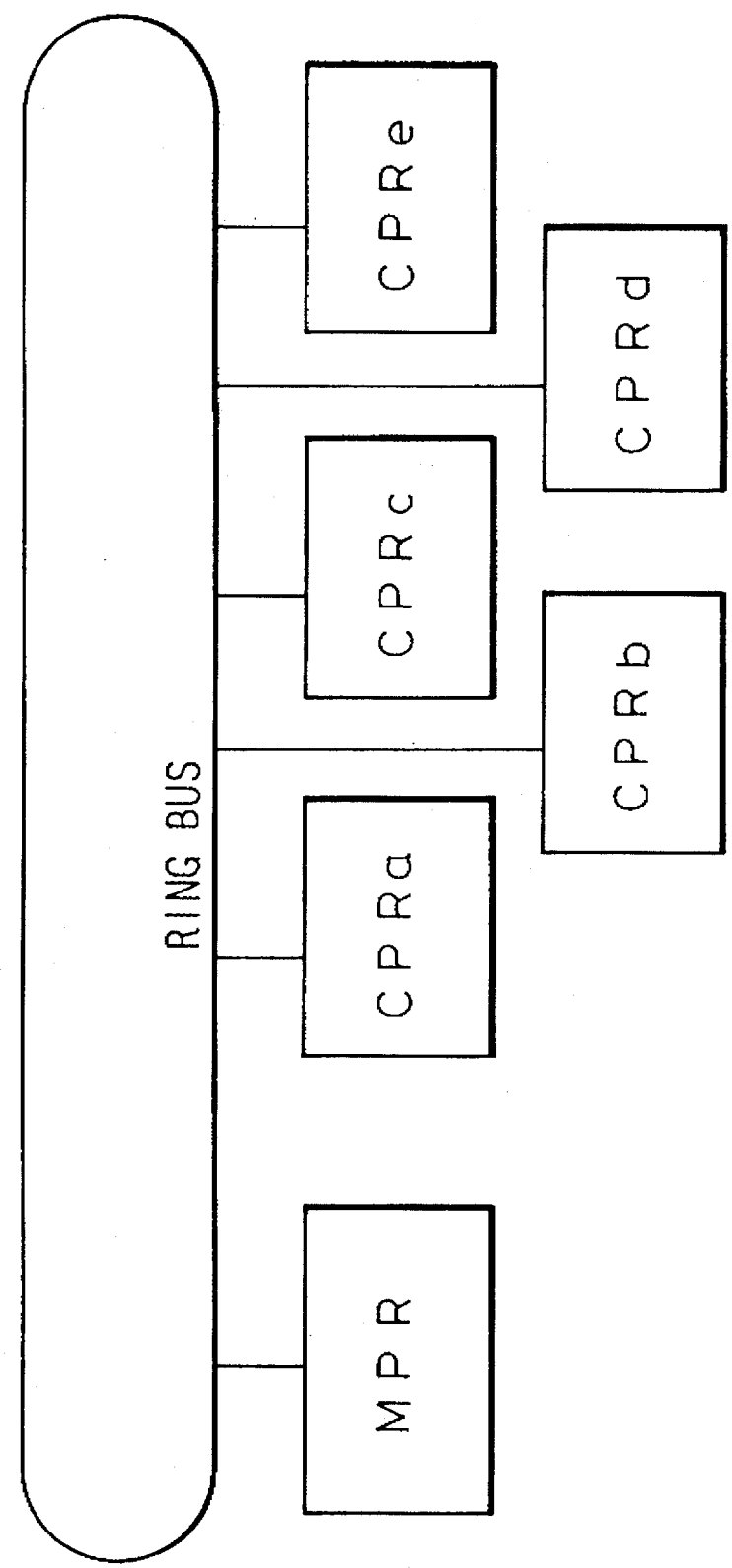
FIG. 7 is a schematic view showing a multiprocessor system for executing an IPL process.
Figure 8:
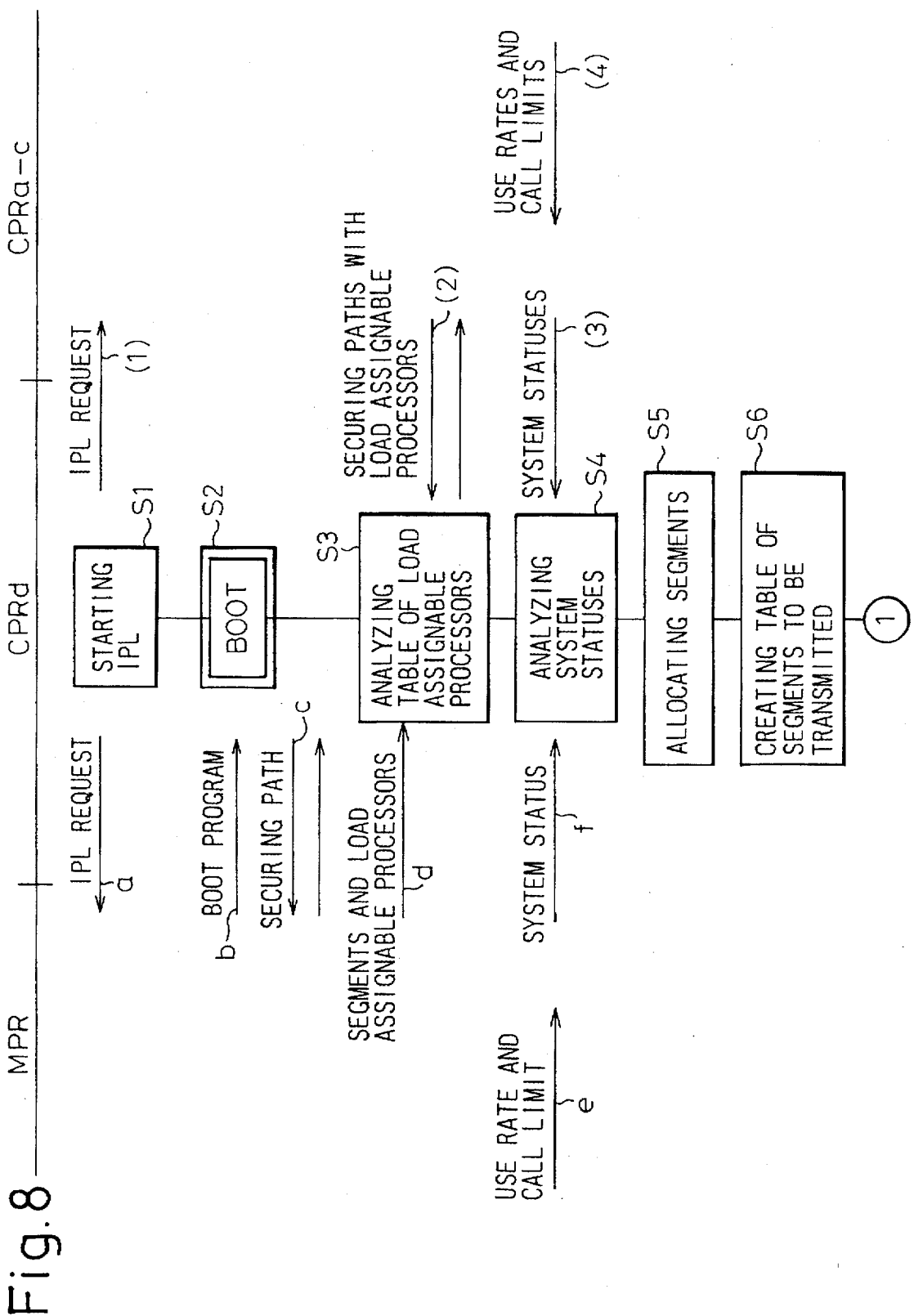
FIG. 8 is a view showing an IPL sequence (1) in a normal state.

FIG. 7 shows a multiprocessor system in which an IPL process is carried out. FIGS. 8, 9A and 9B show sequences 1 and 2 of an IPL process to be carried out under a normal state. FIGS. 10A and 10B show a sequence of an IPL process to be carried out when a fault occurs.

In the multiprocessor system of FIG. 7, a management processor MPR and call processors CPRa to CPRe are connected to one another through a ring bus. The IPL sequences of FIGS. 8, 9A and 9B explain the operations of the processors MPR and CPRa to CPRe when the call processor CPRd issues an IPL request.

The IPL requesting processor CPRd issues the IPL request in step S1 of FIG. 8. The IPL request is simultaneously sent to the processors through the ring bus in actions a and (1). The IPL request is received by the management processor MPR and the call processors. The management processor MPR identifies that it is an IPL request and transfers a boot program to the IPL requesting processor CPRd in action b. The processor CPRd receives and stores the boot program in step S2. A communication path between the processors CPRd and MPR is secured during action c, and the processor MPR sends IPL management data to the processor CPRd through the communication path in action d. The IPL management data include data related to programs, IPL data segments, and load assignable processors.

In this embodiment, the management processor MPR that transfers the boot program holds the data related to data segments and load assignable processors. One, some, or all of the processors CPRa to CPRe may hold such data. In this case, processors that have secured communication channel to the IPL requesting processor after transferring the boot program transfer such data to the IPL requesting processor.

The data related to segments will be explained. Programs and data necessary for an IPL process are handled in units of segments (function modules). Each call processor CPR requires different kinds of segments to carry out an IPL process. The segments are differently combined depending on the function of a given call processor.

The management processor MPR sends segment data of presently operating processors to the IPL requesting processor CPRd, which stores the segment data in a segment table.

FIG. 11 shows an example of the segment table. The IPL requesting processor CPRd refers to the segment table and determines necessary segments and segments to be obtained from other processors. In the table, processor numbers (0 for the management processor MPR, 1 for the call processor CPRa, 2 for the call processor CPRb, . . .) are used as addresses to store segment data kept by the respective processors. Namely, a space in the table corresponding to a given processor number sequentially stores data of segments 1, 2, etc, that are kept by the processor. The table stores three-word (each word consisting of 32 bits) data for each segment number. The three words of data contain a segment start address in an external storage device, a segment size, a processor that stores the segment, etc. The processor that stores the segment may be the management processor MPR, or one of the call processors CPRs, or both the MPR processor and the CPR processors.

According to the data related to load assignable processors, the IPL requesting processor CPRd prepares a table of load assignable processors.

Figure 12:
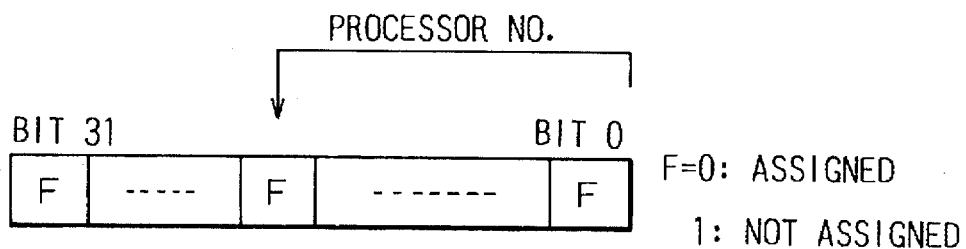
FIG. 12 is a view showing an example of a table of load assignable processors.

FIG. 12 shows an example of the table of load assignable processors. In this example, bits 0 to 31 of a word (32 bits) correspond to processor numbers. If a bit for a given processor is 0, the processor is a load assignable processor, and if it is 1, the processor is not a load assignable processor. In the system of FIG. 7, the processors MPR and CPRa to CPRc are load assignable processors, and the processor CPRe is not a load assignable processor because, for example, it is executing an important operation.

Returning to FIG. 8, the IPL requesting processor CPRd analyzes the table of load assignable processors in step S3 in FIG. 8, secures paths to the load assignable processors CPRa to CPRc except MPR in action (2), and waits for these processors to send system statuses. At this time, no path is secured with respect to the processor CPRe that is not a load assignable processor. If there is a processor to which no communication path is securable or from which no system status is transmitted, such a processor is determined to be abnormal and is excluded from the load assignable processors.

Each of the processors MPR and CPRa to CPRc that have secured communication paths with the IPL requesting processor CPRd reads a use rate of the central controller CC21 of FIG. 5 and a call limit level in actions e and (4), and transfers these data as system statuses to the IPL requesting processor CPRd in actions f and (3) in FIG. 8.

In this case, if a traffic intensity (or load) in the present system is more excessive, a call control (load control against calls) is implemented, in order to suppress it. There are many arbitrary control levels according to the extent of the call control and in this system it is used as call control data.

According to the system statuses, the processor CPRd analyzes the status of each processor in step S4, determines the number of segments to be received from each processor according to a transfer data control table (to be explained later), and allocates the segments to the processors in step S5. At this time, processors that are not load assignable processors or that are abnormal are excluded.

Figure 13:
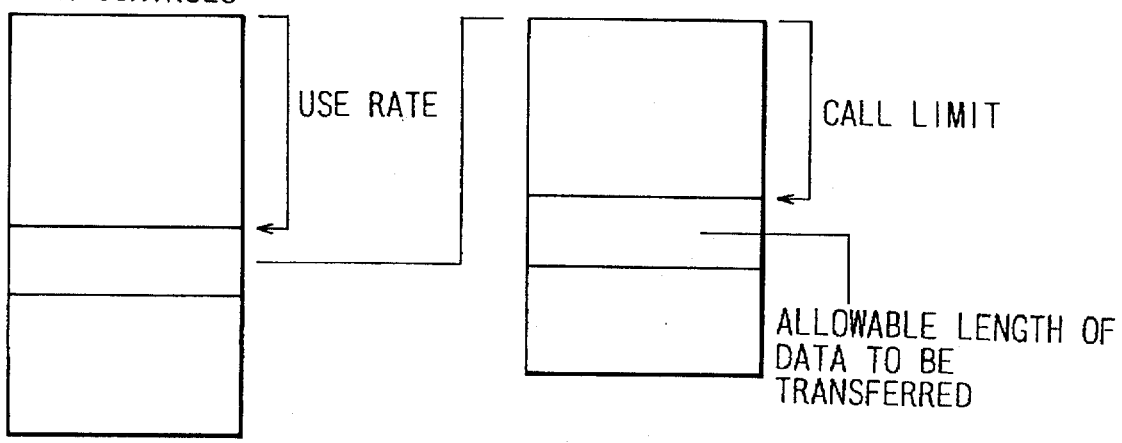
FIG. 13 is a view showing an example of a transfer data control table.

FIG. 13 shows an example of the transfer data control table. According to this table and the system statuses, the IPL requesting processor CPRd determines the load conditions of the other processors and segments to be transferred from these processors. The transfer data control table stores call limit levels 1, 2, . . . , 5 and transferable data lengths corresponding to use rates 10%, 20%, . . . , 90%, respectively. According to this table, the IPL requesting processor finds a transferrable data length for the use rate and call limit of a given processor. For example, if a given processor involves a use rate of 50% and a call limit level of 3, the table shows a corresponding transferrable data length.

The IPL requesting processor CPRd finds the maximum transferable data length of each of the load assignable processors and determines segments to be received for the IPL process. The processor CPRd allocates segments to each of the load assignable processors up to the maximum transferrable data length of each of the processors. To uniformly allocate segments to the processors, segments specific to the respective processors are first allocated and, then, common segments are allocated. At the same time, the IPL requesting processor CPRd prepares a table of segments to be transmitted from the load assignable processors in step S6 of FIG. 8.

Figure 14:
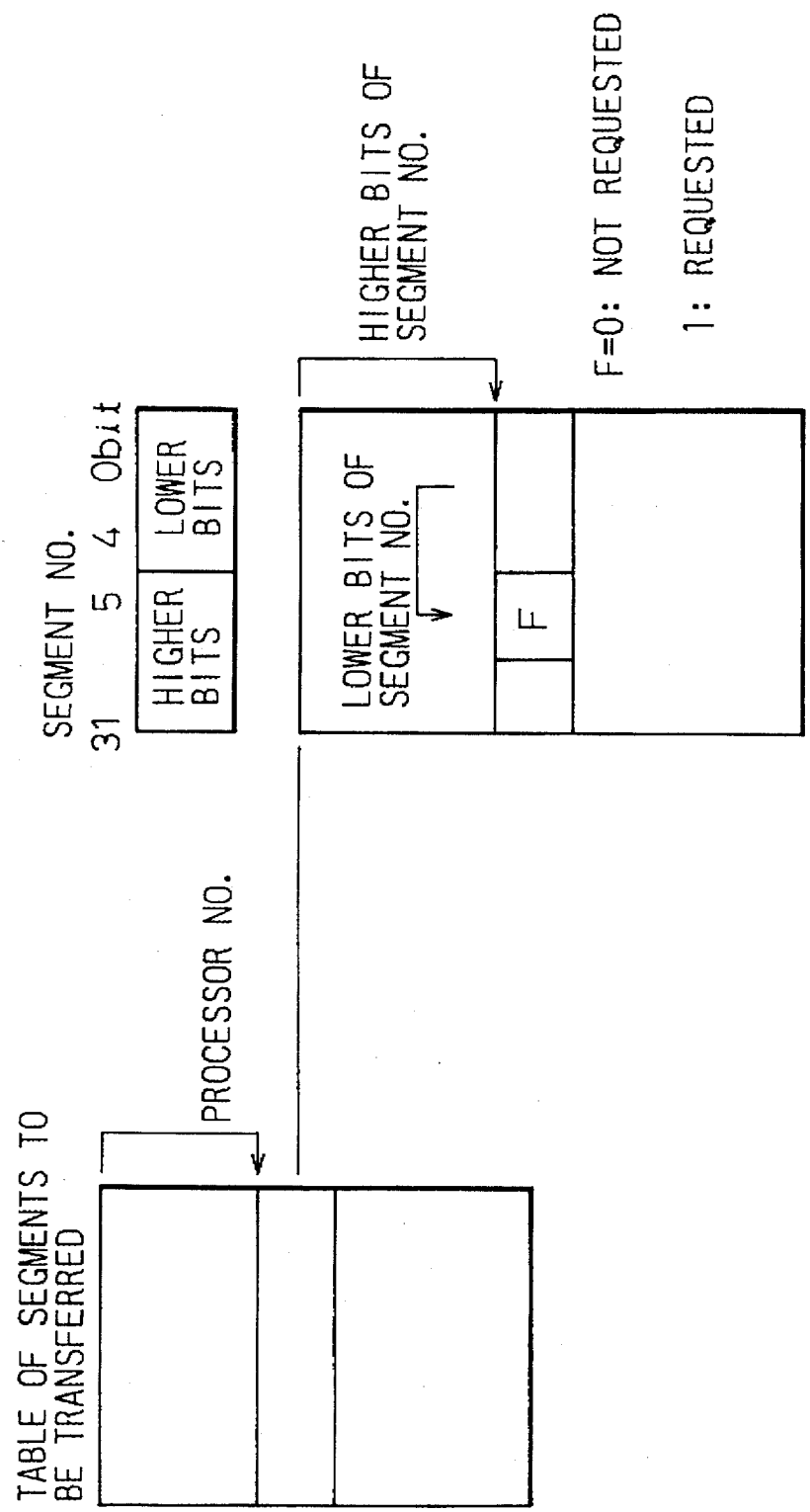
FIG. 14 is a view showing an example of a table of segments to be transmitted.

FIG. 14 shows an example of the table of segments to be transmitted. In this table, the processor number of a given processor serves as the address of a space that stores segment numbers allocated to the processor. The segment numbers are represented using 32 bits. The higher 27 bits from bit 31 to bit 5 indicate an address that stores 32 bits that show the allocation states of 32 segment numbers represented using the lower 5 bits from bit 4 to bit 0. If the lower 5 bits indicate segment numbers 00001 (1 in decimal notation) to 00011 (3 in decimal notation), the allocated segment numbers are 1 to 3 in decimal notation. In this case, the 32-bit word addressed by the higher 27 bits of the segment number that corresponds to the processor number is 000...001110 with lower bits 1 to 3 being each 1 to indicate the requested segments.

In this way, segment numbers allocated to the load assignable processors are set in the table. The IPL requesting processor CPRd picks out the segment numbers and informs the assigned processors of the segment numbers, to request them to send these segments in step S7 and actions g and (5) of FIGS. 9A and 9B.

Upon receiving the segment numbers, each of the assigned processors finds a start address and size in an external storage device according to the segment numbers, reads corresponding data out of the external storage device, and divides the data into transferable blocks in actions h and (6). If the size of a segment is small, it may be contained in a single block. The read segment data are transferred to the IPL requesting processor CPRd block by block in actions i and (7).

FIG. 15 shows an example of a segment. A segment of program or data consists of sections A to E. To transfer the segment, it is divided into blocks, i.e., transferable units. Namely, the segment is transferred in blocks 1 to 4. When any one of the assigned processors reads the last segment (block), the processor transfers it to the IPL requesting processor CPRd with an end flag in actions j and (8).

The processor CPRd stores the received segments in an external storage device in step S8. Upon receiving the end flag, the processor CPRd issues, in action (9), an instruction to send the next segment according to the table of segments to be transmitted (FIG. 14). At the same time, the processor CPRd forms a table of received segments in step S9.

Figure 16:
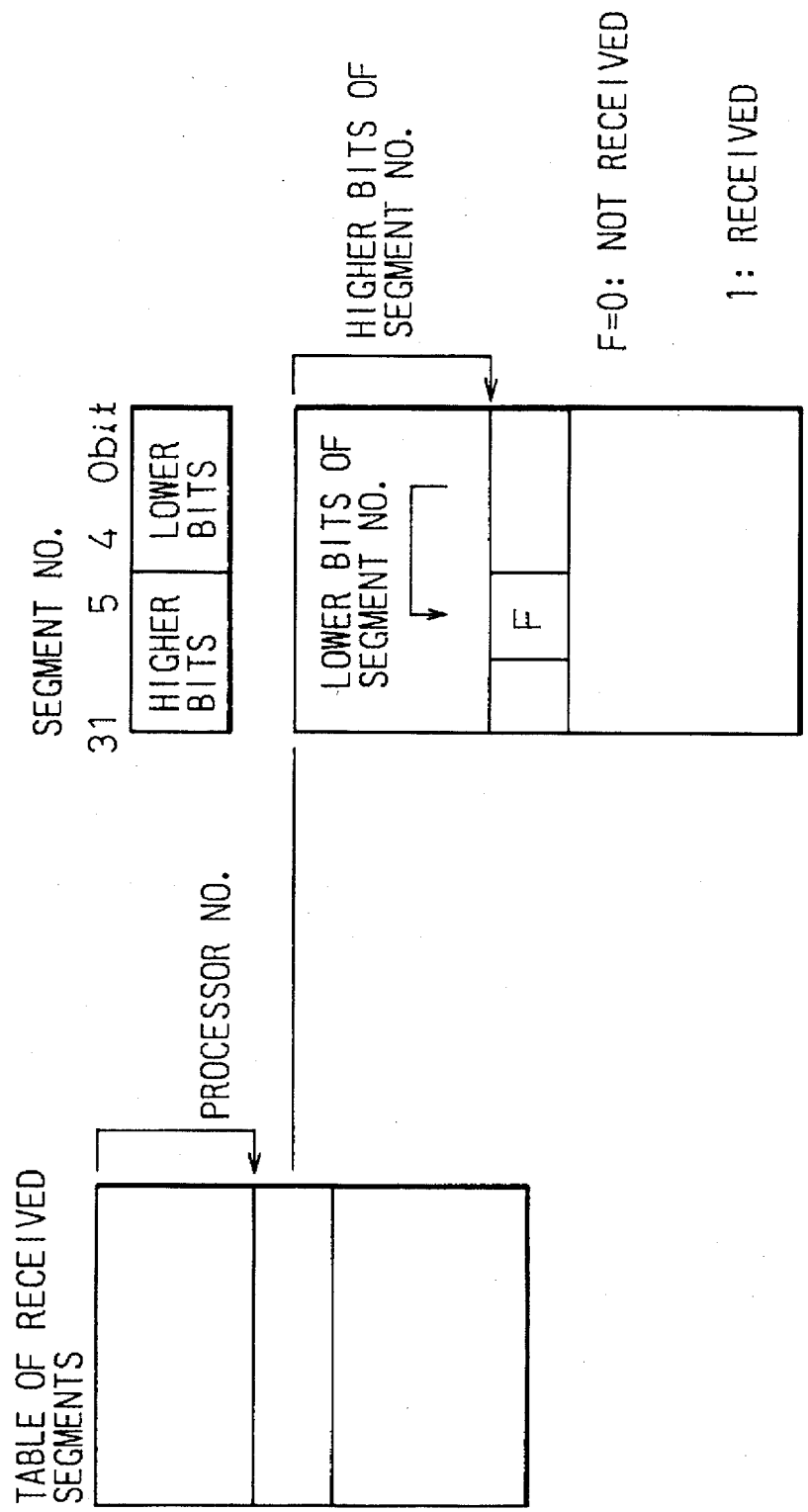
FIG. 16 is a view showing an example of a table of received segments.

FIG. 16 shows an example of the table of received segments. When trouble occurs, this table is used to identify segments that have not been received. This table has the same structure as the table of segments to be transmitted of FIG. 14. When a segment is received from a given processor, the table of received segments stores the segment number of the segment at an address corresponding to the processor number of the processor and sets the bit corresponding to the segment number to 1. If a segment has not been received, the bit corresponding to the segment is 0.

When all required segments are received in step S10 of FIGS. 9A and 9B, the IPL requesting processor CPRd requests the management processor MPR to send station data including data of installed devices, etc., in action k. The processor MPR reads the station data out of the external storage device and transfers the data to the processor CPRd in action 1. Then, the IPL sequences end.

FIGS. 10A and 10B show a control sequence to be taken when an optional one of the processors fails during the transfer of IPL data.

In the figure, the IPL requesting processor CPRd normally carries out communication with the processors MPR, CPRa, and CPRb and has trouble in communicating with the processor CPRc.

In actions a to c and step S1, the IPL requesting processor CPRd receives data segments from the processors MPR, CPRa, and CPRb. At this time, the processor CPRd also receives data segments from the processor CPRc in actions (1) to (3). Then, trouble occurs to disable the transfer of data segments from the processor CPRc in action (4). Since the processor CPRd does not receive requested data within a predetermined time, the processor CPRd detects a fault occurred in the communication channel with the processor CPRc in step S2.

The processor CPRd finds, in step S3, segments not transferred yet according o the table of segments to be transmitted of FIG. 14 and the table of received segments of FIG. 16. The processor CPRd analyzes, in step S4, the system statuses, received in the actions f and (3) of FIG. 8, of the processors that are transferring data. The processor CPRd properly reallocates, in step S5, the segments not yet received to the processors MPR, CPRa, and CPRb that are transferring data, so that they may send the segments that have not been received. A result of the reallocation of segments is recorded in the table of segments to be transmitted in step S6. After the presently transferred segments are completely received by the processor CPRd, the reallocated segments are requested to be transferred. The control sequence of transferring the reallocated segments is the same as the normal sequence.

The management processor MPR sends the data related to load assignable processors (FIG. 12) to the IPL requesting processor CPRd. These data may be set or changed according to instructions entered by a maintenance person through the operation unit 30 of FIG. 5 as follows:

(1) The maintenance person enters command parameters related to the processor number of a given load assignable or unassignable processor into the management processor MPR.

(2) The processor MPR analyzes the entered parameters.

(3) The table of load assignable processors is checked according to the entered processor number.

(4) The table of load assignable processors is updated according to the entered data.

(5) A result of the updating of the table of load assignable processors is passed to the maintenance person in a message.

Figure 17:
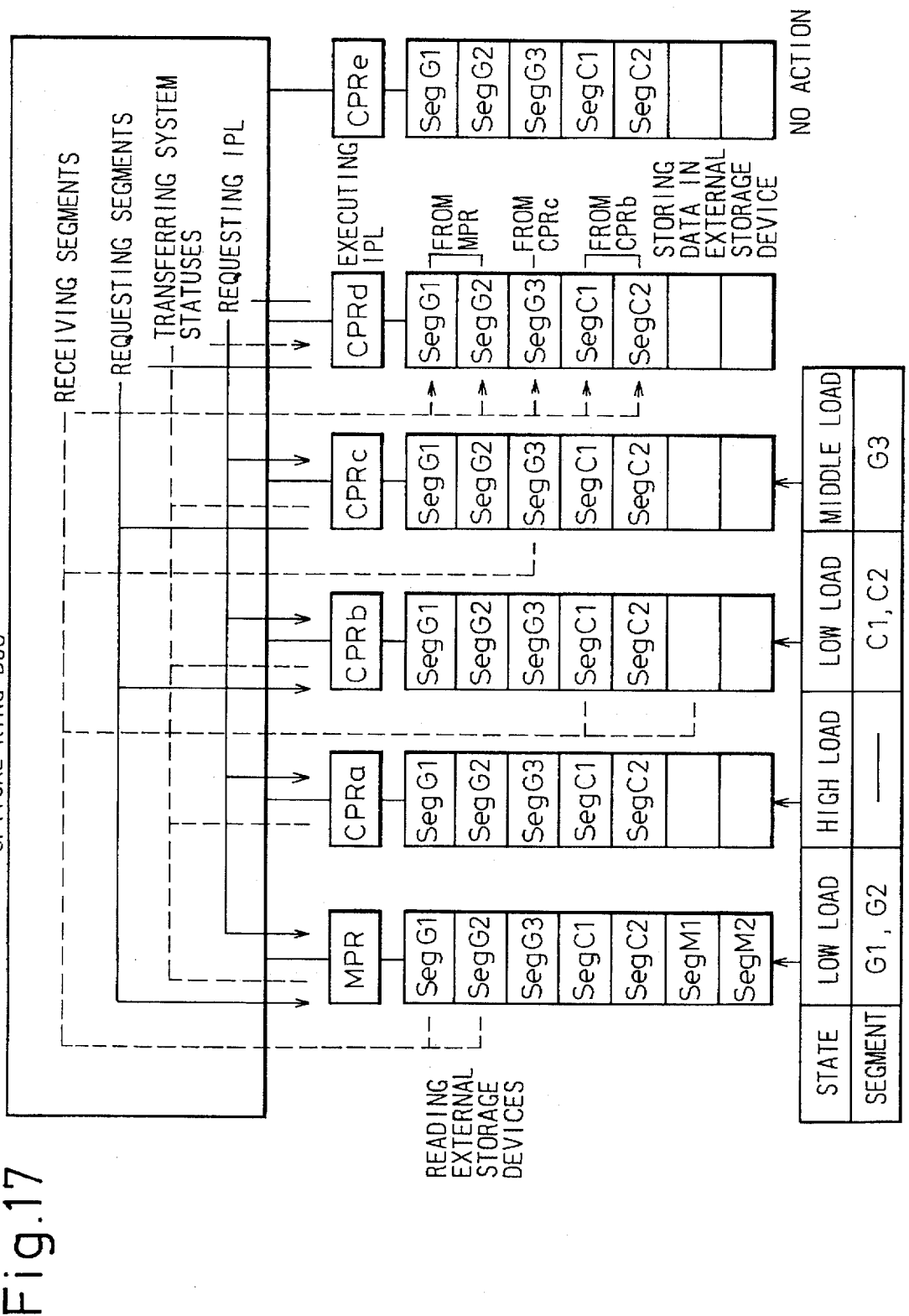
FIG. 17 is a view showing an example of an IPL process which is carried out in a multiprocessor system.

FIG. 17 shows an example of an IPL process carried out in a multiprocessor system.

The multiprocessor system of FIG. 17 includes processors MPR and CPRa to CPRe similar to that of FIG. 7. The processors except the IPL requesting processor CPRd store each program and data segments in an external storage device. The processor CPRd sends an IPL request to the other processors. According to the operations explained with reference to FIGS. 8, 9A and 9B, the management processor MPR sends data related to segments and load assignable processors to the processor CPRd. Thereafter, the processors send their system statuses to the processor CPRd. The processor CPRe is not a load assignable processor.

In FIG. 17, the IPL requesting processor CPRd finds, according to the system statuses, that the processor MPR has low load, the processor CPRa has high load, the processor CPRb has low load, and the processor CPRc has medium load.

IPL data necessary for the processor CPRd are five segments G1, G2, G3, C1, and C2 similar to those for the processors CPRa to CPRc. According to the system statuses, the processor CPRd allocates the segments to the processors such that the segments G1 and G2 are allocated to the processor MPR, no segment is allocated to the processor CPRa, the segments C1 and C2 are allocated to the processor CPRb, and the segment G3 is allocated to the processor CPRc. In this way, the allocation of segments to the processors is well-balanced. According to this allocation, the IPL requesting processor CPRd requests the processors to send the segments and stores necessary IPL data in an external storage device.

According to the present invention, an IPL requesting processor receives a large amount of IPL data from a plurality of processors instead of from a single processor. As a result, no excessive load is applied to any one of the processors. Load on each processor is balanced according to their system statuses. The present invention reduces data to be transferred from each processor, shortens the IPL time, and reduces load on each processor.

Namely, the present invention minimizes fluctuations in load on each processor when carrying out an IPL process and quickly puts an IPL requesting processor into actual operation.

I claim:

1. An initial program loading (IPL) system, for a multi-processor system having a plurality of processors that communicate data with one another through communication channels and share programs and data with one another, comprising:

one processor serving as an IPL requesting processor that issues an IPL request to be received by the other processors, another processor serving as a management processor that holds IPL management data including data of load assignable processors that may provide the IPL requesting processor with IPL data, the IPL management processor transferring the IPL management data to the IPL requesting processor when a communication path is secured between them, the IPL requesting processor assigning, according to the data of load assignable processors and the statuses of these processors, processors that must provide segments of IPL data and issuing instructions to the assigned processors, to transfer the IPL data, the assigned processors transferring the specified segments of IPL data to the IPL requesting processor, which receives the IPL data and stores the IPL data in a storage device, the processors except the IPL requesting processor transfer system statuses to the IPL requesting processor when communication paths to the IPL requesting processor are secured, and the IPL requesting processor assigns the processors that must provide the IPL data and balances the quantities of the IPL data to be allocated to the assigned processors according to the system statuses of the assigned processors and the IPL management data.

2. An initial program loading (IPL) system, for a multi-processor system having a plurality of processors that communicate data with one another through communication channels and share programs and data with one another, comprising:

one processor serving as an IPL requesting processor that issues an IPL request to be received by the other processors, another processor serving as a management processor that holds IPL management data including data of load assignable processors that may provide the IPL requesting processor with IPL data, the IPL management processor transferring the IPL management data to the IPL requesting processor when a communication path is secured between them, the IPL requesting processor assigning, according to the data of load assignable processors and the statuses of these processors, processors that must provide segments of IPL data and issuing instructions to the assigned processors, to transfer the IPL data, the assigned processors transferring the specified segments of IPL data to the IPL requesting processor, which receives the IPL data and stores the IPL data in a storage device, wherein the IPL requesting processor properly allocates segments of the IPL data to the assigned processors, and prepares a table of segments to be transmitted by the assigned processors, as well as a table of segments received from the assigned processors according to the table of segments to be transmitted, and wherein, when any one of the processors except the IPL requesting processor causes an abnormality by not transferring IPL data, the IPL requesting processor detects the abnormality, reassigns good processors to send the IPL data not transmitted according to the table of segments to be transmitted and the table of received segments, and instructs the reassigned processors to transmit the IPL data not transmitted.

3. An initial program loading (IPL) system, for a multi-processor system having a plurality of processors that communicate data with one another through communication channels and share programs and data with one another, comprising:

one processor serving as an IPL requesting processor that issues an IPL request to be received by the other processors, another processor serving as a management processor that holds IPL management data including data of load assignable processors that may provide the IPL requesting processor with IPL data, the IPL management processor transferring the IPL management data to the IPL requesting processor when a communication path is secured between them, the IPL requesting processor assigning, according to the data of load assignable processors and the statuses of these processors, processors that must provide segments of IPL data and issuing instructions to the assigned processors, to transfer the IPL data, the assigned processors transferring the specified segments of IPL data to the IPL requesting processor, which receives the IPL data and stores the IPL data in a storage device, wherein:

the management processor has means for rewriting the data of load assignable processors according to an entered instruction, and the management processor transfers a boot program and then the IPL management data to the IPL requesting processor in response to the IPL request, the IPL management data including the data of load assignable processors and data related to IPL data segments and being used to control the processors that transfer IPL data and the processors that do not transfer IPL data.

* * * * *